(12) United States Patent
Kozuka

(10) Patent No.: US 11,803,220 B2
(45) Date of Patent: Oct. 31, 2023

(54) INFORMATION PROCESSING APPARATUS AND METHOD

(71) Applicant: Canon Kabushiki Kaisha, Tokyo (JP)

(72) Inventor: Yasuhiro Kozuka, Toyko (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 17/178,757

(22) Filed: Feb. 18, 2021

(65) Prior Publication Data
US 2021/0255683 A1 Aug. 19, 2021

(30) Foreign Application Priority Data
Feb. 19, 2020 (JP) .................................. 2020-026472

(51) Int. Cl.
G06F 1/26 (2006.01)
G06F 21/44 (2013.01)
G06F 1/28 (2006.01)
G06F 21/57 (2013.01)

(52) U.S. Cl.
CPC ................ G06F 1/266 (2013.01); G06F 1/28 (2013.01); G06F 21/44 (2013.01); G06F 21/572 (2013.01); G06F 21/575 (2013.01); G06F 2221/034 (2013.01)

(58) Field of Classification Search
None
See application file for complete search history.

(56) References Cited

U.S. PATENT DOCUMENTS 10,712,778 B1 * 7/2020 Morgan ..................... G06F 1/26
10,712,982 B2 7/2020 Konosu
10,728,409 B2 7/2020 Kozuka
11,006,013 B2 5/2021 Umimura
2013/0139270 A1 * 5/2013 Yoshida ................... G06F 21/51 726/26
2015/0347228 A1 * 12/2015 Yang .................... H03M 13/612 714/704

FOREIGN PATENT DOCUMENTS

| JP | 2003-099310 A | 4/2003 |
| JP | 2014-099097 A | 5/2014 |
| JP | 2019128792 A | 8/2019 |
| JP | 2019-175331 A | 10/2019 |

OTHER PUBLICATIONS

Japanese Office Action issued in corresponding Japanese Application No. 2020-026472 dated Aug. 4, 2023.

* cited by examiner

*Primary Examiner* — Paul Yen
(74) *Attorney, Agent, or Firm* — Venable LLP

(57) ABSTRACT

An information processing apparatus includes: at least one device; a first processor configured to control the at least one device; a second processor configured to verify validity of a program to be executed by the first processor, and to allow the first processor to execute the program when the program is determined to be valid; and a control circuit configured to control supply of power to the at least one device. The second processor starts the verification of the program in response to the information processing apparatus being powered on. The first processor starts the execution of the program at least based on a first control signal indicating that the program is determined to be valid. The control circuit starts the supply of the power to the at least one device before the determination that the program is valid.

8 Claims, 7 Drawing Sheets

F I G. 3
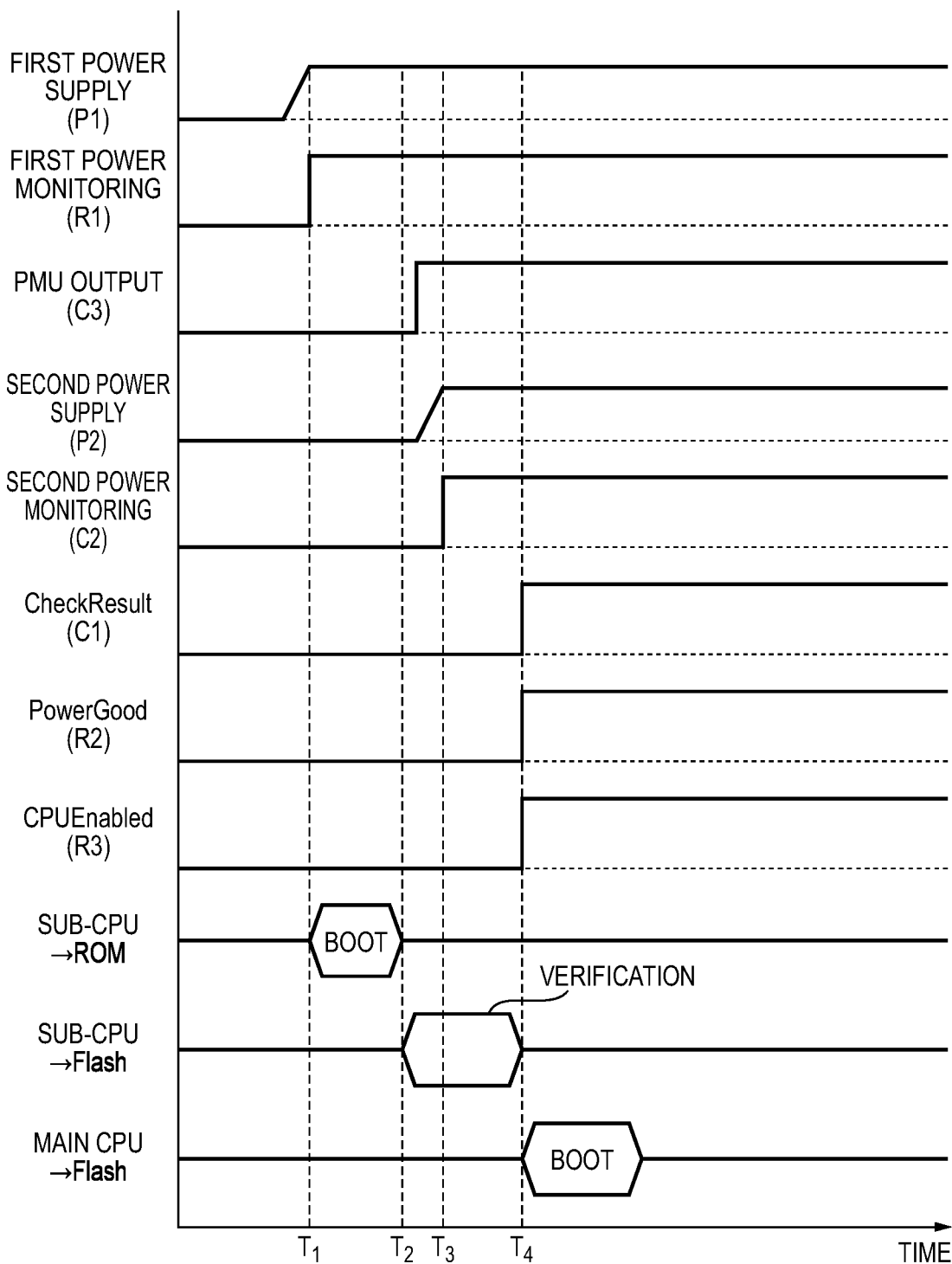

INFORMATION PROCESSING APPARATUS AND METHOD

BACKGROUND OF THE INVENTION

Field of the Invention

The present disclosure relates to an information processing apparatus and method.

Description of the Related Art

As countermeasures to a risk that a program, such as software or firmware, incorporated into an apparatus is altered, a technique has been known which verifies validity of the program prior to activation of the apparatus (also referred to as a secure boot). Verifying the validity of the program is also beneficial in terms of protecting the apparatus from degradation of the program as well as alteration.

In general, a CPU that controls various functions of an apparatus cannot completely verify validity of a program for activating the CPU. Thus, a configuration may be employed in which an auxiliary processor that is configured to verify the validity of the program is provided separate from the main CPU. In this case, the auxiliary processor first verifies the validity of the program to be executed by the CPU, and the CPU executes the program determined to be valid.

Japanese Patent Laid-Open No. 2019-128792 discloses a multi-function peripheral that employs the secure boot technique using an auxiliary processor. According to Japanese Patent Laid-Open No. 2019-128792, a microcomputer separate from a main CPU that controls a group of devices constituting the multi-function peripheral verifies validity of a program to be executed by the CPU. The CPU executes the program determined to be valid to start supply of power from a power supply control unit to the devices such as a scanner and a printer, and setup of the devices. After this setup ends, the multi-function peripheral shifts to a usable state by a user.

SUMMARY OF THE INVENTION

However, in the technique disclosed by Japanese Patent Laid-Open No. 2019-128792, the supply of the power to the devices and the setup do not start until the verification of the validity of the program is successfully completed and the CPU executes the program. For this reason, the user waits for a long period of time from the power-on of the multi-function peripheral until the multi-function peripheral is actually ready for use. The waiting period of time becomes even longer, for example, when once the verification of the program is unsuccessful, and a system automatically restores the program.

Therefore, it is desirable to reduce a period of time required to activate an apparatus while maintaining security against risks of unauthorized operations.

According to an aspect, there is provided an information processing apparatus, including: at least one device; a first processor configured to control the at least one device; a second processor configured to verify validity of a program to be executed by the first processor, and to allow the first processor to execute the program when the program is determined to be valid; and a control circuit configured to control supply of power to the at least one device. The second processor is configured to start the verification of the program in response to the information processing apparatus being powered on. The first processor is configured to start the execution of the program at least based on a first control signal indicating that the program is determined to be valid by the second processor. The control circuit is configured to start the supply of the power to the at least one device before the determination that the program is valid. A corresponding method is also provided.

Further features of the present invention will become apparent from the following description of exemplary embodiments (with reference to the attached drawings).

BRIEF DESCRIPTION OF THE DRAWINGS

FIG. 3 is a timing chart illustrating operation timings of respective units of the information processing apparatus in a scenario in which first verification of a program is successful.

DESCRIPTION OF THE EMBODIMENTS

Figure 1:
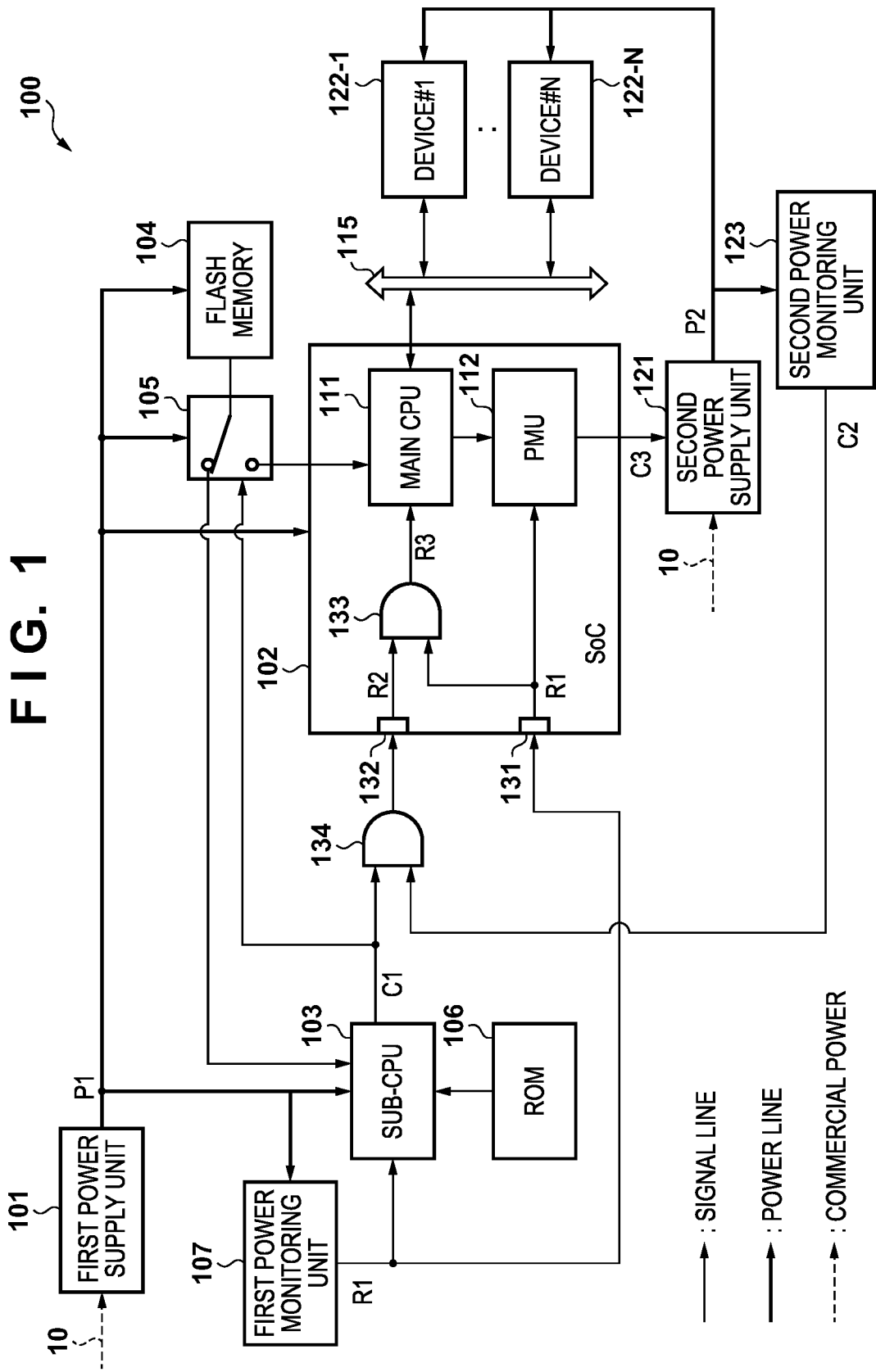
FIG. 1 is a block diagram illustrating an example of a configuration of an information processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. Configuration of Apparatus

In this section, an example will be described in which a technology according to the present disclosure is applied to an information processing apparatus. The term of information processing apparatus in this specification broadly includes various apparatuses each of which operates by executing a computer program by a processor or a processing circuit. The information processing apparatus may be, for example, a computer, an electronic device, a server apparatus, a terminal device, a storage device, a display device, a communication device, an image processing device, or a voice processing device.

FIG. 1 is a block diagram illustrating an example of a configuration of an information processing apparatus 100 according to an embodiment. Referring to FIG. 1, the information processing apparatus 100 includes a first power supply unit 101, an SoC 102, a sub-CPU 103, a flash memory 104, a selector 105, a ROM 106, a first power monitoring unit 107, and an AND circuit 134. In the present embodiment, the system on a chip (SoC) 102 includes a main CPU 111, a PMU 112, a first input terminal 131, a second input terminal 132, and an AND circuit 133. That is, at least the main CPU 111 and the PMU 112 are provided in a common chip. The information processing apparatus 100 further includes a second power supply unit 121, N devices (N is an integer equal to or larger than 1) 122-1 to 122-N, and a second power monitoring unit 123. Note that, in the following description, when there is no need to distinguish the devices 122-1 to 122-N from each other, these are collectively referred to as devices 122.

The first power supply unit 101 is connected to a commercial power source 10. The first power supply unit 101 supplies power P1 to the SoC 102, the sub-CPU 103, the flash memory 104, and the selector 105 when a main power supply of the information processing apparatus 100 is turned on, for instance, in response to a user operating a power switch (not illustrated).

The main central processing unit (CPU) 111 is a processor (first processor) that controls the respective devices 122 of the information processing apparatus 100. The main CPU 111 is connected to the flash memory 104 via the selector 105. The main CPU 111 is connected to the respective devices 122 via a signal bus 115. The main CPU 111 activates a basic system of the information processing apparatus 100, for instance, by executing a boot program that is stored in the flash memory 104 in advance.

The power management unit (PMU) 112 is a control circuit that controls supply of power to the respective devices 122. The PMU 112 instructs the second power supply unit 121 to start supply of power P2 to the respective devices 122, for example, in response to the main power supply of the information processing apparatus 100 being powered on. The instruction may be made by using a control signal C3.

The sub-CPU 103 is a processor (second processor) that verifies validity of a program to be executed by the main CPU 111. The sub-CPU 103 operates by executing firmware that is stored in the ROM 106 in advance. The sub-CPU 103 determines, in its operation, whether the boot program of the main CPU 111 stored in the flash memory 104 is valid or not prior to execution by the main CPU 111. When it is determined that the boot program is valid, the sub-CPU 103 allows the main CPU 111 to execute the boot program. When it is determined that the boot program is invalid, the sub-CPU 103 may restore the boot program by overwriting the boot program in the flash memory 104 with a version for restoration of the boot program. The sub-CPU 103 may verify the validity of the boot program again after the restoration, and when the verification is successful, the sub-CPU 103 may allow the main CPU 111 to execute the boot program after the restoration.

The flash memory 104 is a storage unit that stores a program to be executed by the main CPU 111 and to be verified by the sub-CPU 103. An example in which the boot program of the main CPU 111 is to be verified by the sub-CPU 103 will be mainly described herein, but the present embodiment is not limited to such an example. For instance, other types of programs such as a basic input/output system (BIOS) program or an operating system (OS) program may also be subject to the verification by the sub-CPU 103. Similarly to the sub-CPU 103, the flash memory 104 receives supply of power in response to the information processing apparatus 100 being powered on. As a result, at the beginning of the activation of the information processing apparatus 100, the sub-CPU 103 can read the program from the flash memory 104 to verify the validity of the read program.

The selector 105 is a switching unit that selectively switches a CPU that is an access source to the flash memory 104 between the sub-CPU 103 and the main CPU 111. The selector 105 connects a signal path to the flash memory 104 to the sub-CPU 103 at the beginning of the activation of the information processing apparatus 100. The sub-CPU 103 reads the boot program of the main CPU 111 from the flash memory 104 via the selector 105 to verify the validity of the read program. When the verification is successful, the sub-CPU 103 outputs a control signal C1 indicating the success of the verification to the selector 105. The selector 105 connects the signal path to the flash memory 104 to the main CPU 111 in response to receiving the control signal C1 from the sub-CPU 103. As a result, the main CPU 111 can read the boot program (and other required programs) from flash memory 104. Note that the signal path from each CPU to the flash memory 104 may be implemented as a serial peripheral interface (SPI) bus, for instance.

The read only memory (ROM) 106 is a non-volatile, non-rewritable memory. The ROM 106 may be accessible only by the sub-CPU 103. The ROM 106 stores, for example, firmware for the operation of the sub-CPU 103 and a public key for decrypting a signature of the program to be verified.

The first power monitoring unit 107 monitors a level of the power P1 supplied from the first power supply unit 101 to the SoC 102, the sub-CPU 103, and the like, and outputs a reset signal R1 dependent on the power level of the power P1 to the sub-CPU 103 and the SoC 102. For instance, when the power level of the power P1 is lower than a predefined threshold value, the reset signal R1 is asserted (for instance, a signal value is maintained at zero or Low). While the reset signal R1 is being asserted, the sub-CPU 103 and the SoC 102 are maintained in a reset state, and the operations thereof are suppressed. When the power level of the power P1 exceeds the threshold value, the first power monitoring unit 107 deasserts the reset signal R1 (for instance, the signal value is switched to 1 or High). The sub-CPU 103 is released from the reset state in response to the deassertion of the reset signal R1. The sub-CPU 103 starts the operation when being released from the reset state, and reads the firmware described above from the ROM 106 to execute the read firmware. This means that the sub-CPU 103 starts verifying the program to be executed by the main CPU 111 in response to the main power supply of the information processing apparatus 100 being turned on.

The SoC 102, as a whole chip, is also released from the reset state in response to the deassertion of the reset signal R1. The reset signal R1 input to the first input terminal 131 of the SoC 102 is input directly to a reset terminal of the PMU 112. Accordingly, the PMU 112 is also released from the reset state in response to the deassertion of the reset signal R1. This means that the PMU 112 starts the operation in response to the main power supply of the information processing apparatus 100 being turned on, similarly to the sub-CPU 103.

On the other hand, the operation of the main CPU 111 is suppressed by a reset signal R3. The AND circuit 133 receives the reset signal R1 and a reset signal R2 and then outputs the reset signal R3 indicating a logical product of these signal values to a reset terminal of the main CPU 111. Accordingly, the main CPU 111 is released from the reset state only when the reset signal R1 is deasserted (the whole SoC 102 and the PMU 112 are released from the reset states) and the reset signal R2 is deasserted. The AND circuit 134 receives the control signal C1 from the sub-CPU 103 and a control signal C2 from the second power monitoring unit 123, and outputs the reset signal R2 indicating a logical product of these signal values to the second input terminal 132 of the SoC 102. The reset signal R2 is output to one of the two input terminals of the AND circuit 133 after being received by the second input terminal 132. Accordingly, the reset signal R2 is deasserted when the control signal C1 is deasserted and the control signal C2 is deasserted. The control signal C1 is deasserted by the sub-CPU 103 in response to the determination that the program of the main CPU 111 is valid. As will be described later, the control signal C2 is deasserted by the second power monitoring unit 123 when a level of the power P2 supplied from the second power supply unit 121 to each device 122 exceeds a threshold value.

When both of the reset signals R1 and R2 are deasserted and the reset signal R3 is deasserted in response to the deassertion of the reset signals R1 and R2, the main CPU 111 reads the boot program from flash memory 104 and executes the read boot program. As a result, the basic system of the information processing apparatus 100 is activated. The main CPU 111 further performs setup of the respective devices 122 by executing an additional program stored in the flash memory 104 or any one of devices 122. When this setup is completed, the information processing apparatus 100 is in a state that can be used by the user, and the information processing apparatus 100 enters a normal standby state. In the normal standby state of the information processing apparatus 100, the main CPU 111 performs an operation instructed by the user by using the devices 122, for instance, in accordance with user input.

The second power supply unit 121 is connected to the commercial power source 10. When receiving the instruction of starting the supply of the power from the PMU 112 as described above, the second power supply unit 121 starts the supply of the power P2 to the devices 122-1 to 122-N. The devices 122-1 to 122-N may include at least one of a printer device, a scanner device, an operating device, a display device, a device controller, an image processing unit, and a communication interface. The second power monitoring unit 123 monitors the level of the power P2 supplied to the devices 122-1 to 122-N, and outputs the control signal C2 dependent on the power level of the power P2 to the AND circuit 134 described above. For instance, when the power level of the power P2 is lower than a predefined threshold value, the control signal C2 is asserted (for instance, the signal value is maintained at zero or Low). When the power level of the power P2 exceeds the threshold value, the second power monitoring unit 123 deasserts the control signal C2 (for instance, the signal value is switched to 1 or High).

Figure 4:
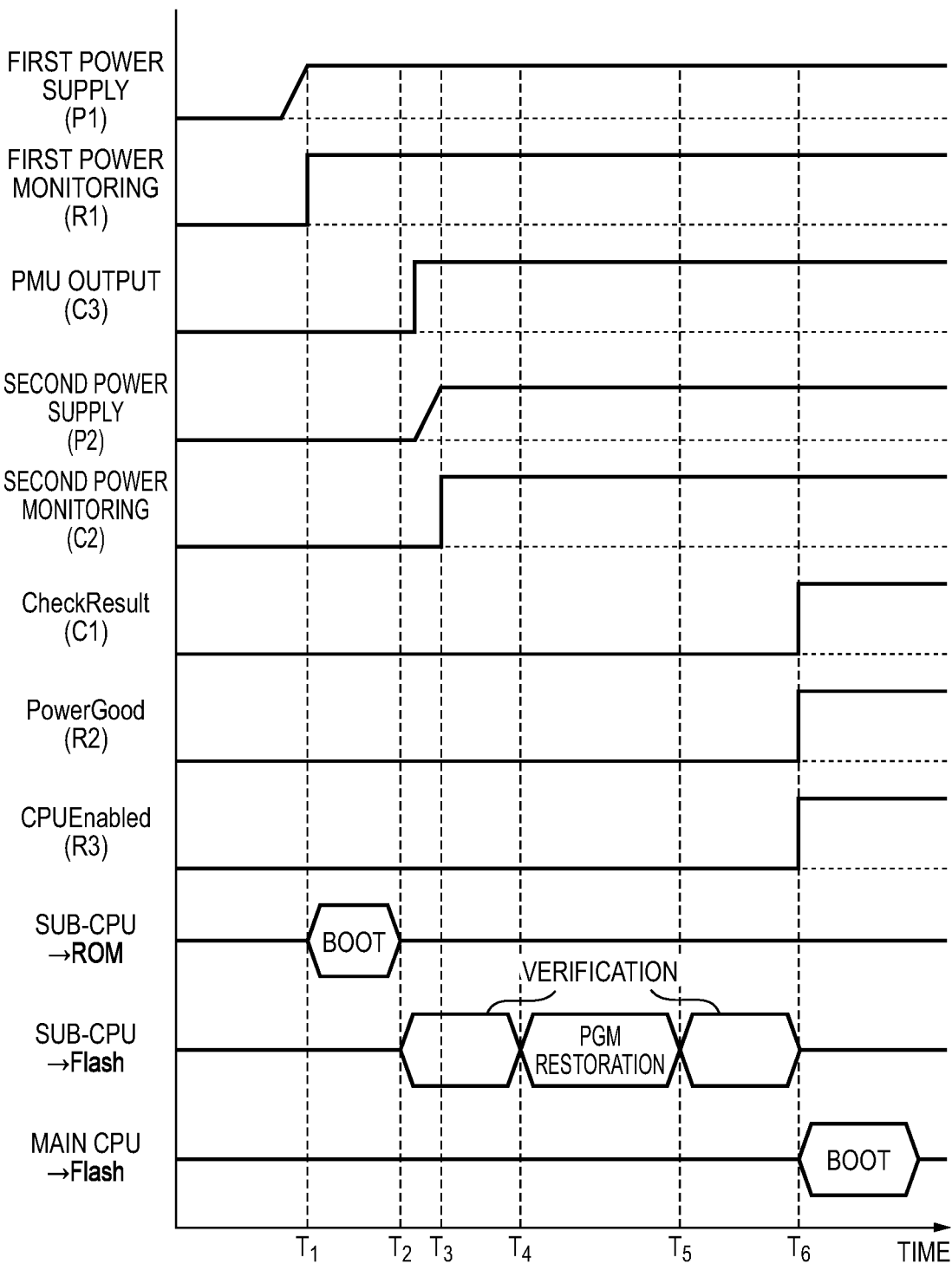
FIG. 4 is a timing chart illustrating operation timings of the respective units of the information processing apparatus in a scenario in which the first verification of the program fails and the program is restored.

Note that properties of the respective signals described above are not limited by the names of the signals. For instance, the names of the reset signal and the control signal may be interchangeable. In FIG. 3 and FIG. 4, which will be described later, the control signal C1 is indicated as a CheckResult signal, the control signal C2 is indicated as a second power supply monitoring signal, and the control signal C3 is indicated as a PMU output signal. Further, the reset signal R1 is indicated as a first power supply monitoring signal, the reset signal R2 is indicated as a Power-Good signal, and the reset signal R3 is indicated as a CPUEnabled signal.

Figure 2:
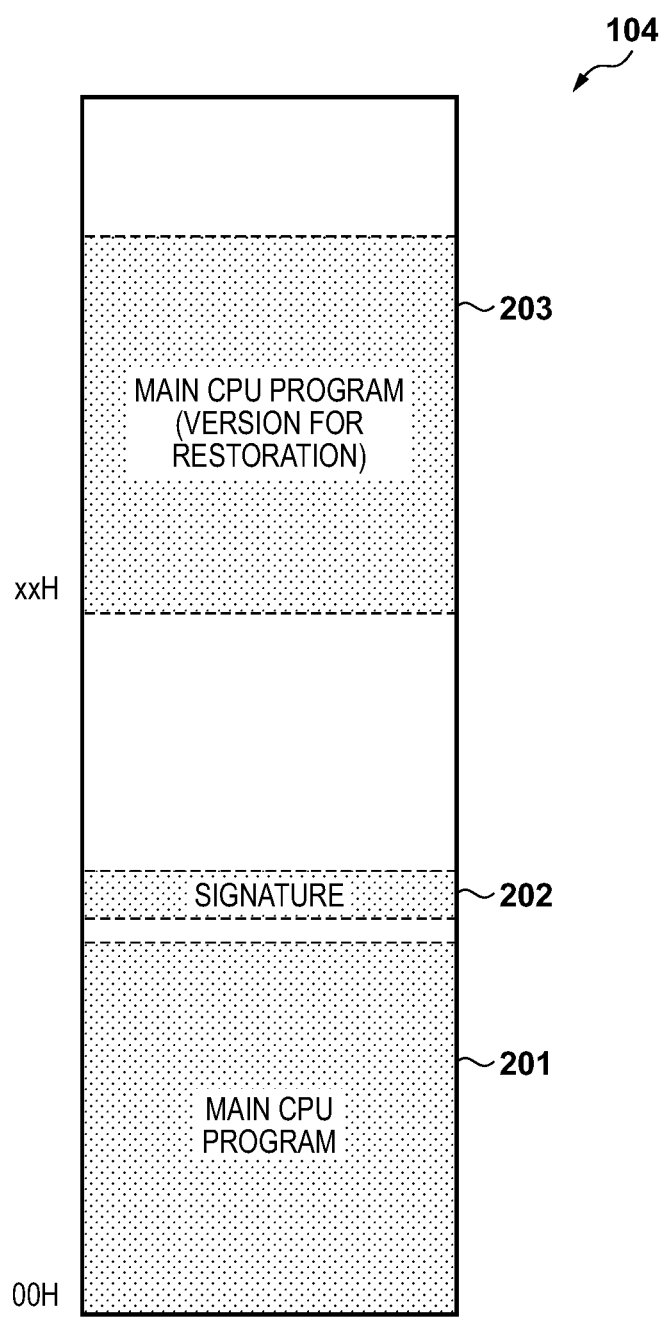
FIG. 2 is an explanatory diagram for describing an example of a memory map of a flash memory illustrated in FIG. 1.

FIG. 2 is an explanatory diagram for describing an example of a memory map of the flash memory 104 illustrated in FIG. 1. As illustrated in FIG. 2, the flash memory 104 stores a main CPU program (for instance, a boot program) 201, a signature 202, and a version for restoration 203 of the main CPU program in advance. The main CPU program 201 is typically stored in a storage area at the leading of the flash memory 104. The signature 202 is a signature for verifying validity of the main CPU program 201. The signature 202 may be derived in advance by encrypting a hash value of the (valid) main CPU program 201 with a private key of a public key cryptosystem to be stored in the flash memory 104. The signature 202 may be based on any type of digital signature system such as an RSA signature, a DSA signature, or an ECDSA signature, for instance. The version for restoration 203 of the main CPU program is stored in a storage area known to the sub-CPU 103 in the flash memory 104 (in the example of FIG. 2, the area starting from an address of xxH).

When verifying the validity of the main CPU program 201, the sub-CPU 103 derives a hash value from program data of the main CPU program 201. The sub-CPU 103 also generates a hash value of the valid program data by decrypting the signature 202 with a public key stored in the ROM 106. Then, the sub-CPU 103 determines that the main CPU program 201 read from the flash memory 104 is valid when the two hash values match with each other. On the other hand, when the two hash values do not match, the sub-CPU 103 determines that the main CPU program 201 is not valid (for instance, the main CPU program 201 is altered or degraded). As a result of the verification of the signature 202, when the sub-CPU 103 determines that the main CPU program 201 is not valid, the sub-CPU 103 writes the version for restoration 203 into the storage area at the leading of the flash memory 104. Accordingly, the main CPU program 201 that has lost the validity (for instance, that has been altered) may be overwritten with the version for restoration 203, and the required program may be restored. Note that the version for restoration 203 may be stored in a different storage medium from the flash memory 104 as long as the version for restoration 203 is accessible from the sub-CPU 103. The storage medium may be inside or outside of the information processing apparatus 100.

2. Timing Chart

FIG. 3 and FIG. 4 are timing charts illustrating operation timings of respective units of the information processing apparatus 100 described above. In each timing chart, a horizontal axis represents time. In a first scenario of FIG. 3, the verification of the main CPU program 201 by the sub-CPU 103 is successful in the first verification. On the other hand, in a second scenario in FIG. 4, once the verification of the main CPU program 201 by the sub-CPU 103 fails, the program is subsequently restored.

<2-1. First Scenario>

In the first scenario of FIG. 3, first, at time Ti, for instance, in response to the user operating the power switch, the level of the power P1 from the first power supply unit 101 increases to a constant voltage. When the level of the power P1 exceeds the threshold value, the first power monitoring unit 107 deasserts the reset signal R1 (the signal value is switched from Low to High). In response to the deassertion of the reset signal R1, the sub-CPU 103 is activated (booted) by executing the firmware that is read from the ROM 106. The PMU 112 is also activated in parallel with the activation of the sub-CPU 103 in response to the deassertion of the reset signal R1. The activation of the sub-CPU 103 and the PMU 112 end at time Tz, for instance. After the activation, the sub-CPU 103 starts reading the main CPU program 201 from the flash memory 104 and verifying the read main CPU program 201.

The PMU 112 instructs the second power supply 121 to start supplying the power P2 by deasserting the control signal C3 to the second power supply unit 121 after the activation. The level of the power P2 from the second power supply unit 121 rises to a constant voltage in response to the deassertion of the control signal C3. The second power monitoring unit 123 deasserts the control signal C2 at time $T_3$ when the level of the power P2 exceeds the threshold value. However, at the time $T_3$, the verification of the main CPU program 201 by the sub-CPU 103 has not ended, so the deassertion of the control signal C2 does not immediately cause anything to happen.

At time $T_4$, the verification of the main CPU program 201 by the sub-CPU 103 successfully ends. The sub-CPU 103 then deasserts the control signal C1 to be output to the AND circuit 134. In response to the deassertion of the control signal C1, the reset signal R2 that indicates the logical product of the control signal C1 and the control signal C2 is also deasserted. In response to the deassertion of the reset signal R2, the reset signal R3 that indicates the logical product of the reset signal R2 and the reset signal R1 is also deasserted. The main CPU 111 is released from the reset state in response to the deassertion of the reset signal R3, and reads the main CPU program 201 (whose validity has been verified) from the flash memory 104 to execute the read main CPU program 201, thereby being activated (booted).

<2-2. Second Scenario>

In the second scenario of FIG. 4, operations and changes in signal values of the respective units until the time $T_3$ are similar to those in FIG. 3. At the time $T_4$, the verification of the main CPU program 201 by the sub-CPU 103 ends, and the sub-CPU 103 determines that the main CPU program 201 is not valid. Thus, at the time $T_4$, the sub-CPU 103 maintains the control signal C1 in a state of being asserted. The sub-CPU 103 restores the main CPU program 201 in the storage area at the leading of the flash memory 104 by overwriting the main CPU program 201 with the version for restoration 203 between the time $T_4$ and time T5. When the restoration is completed, the sub-CPU 103 performs the verification of the main CPU program 201 again.

At time T6, the verification of the main CPU program 201 after the restoration is successfully ended. The sub-CPU 103 then deasserts the control signal C1 to be output to the AND circuit 134. In response to the deassertion of the control signal C1, the reset signal R2 that indicates the logical product of the control signal C1 and the control signal C2 is also deasserted. In response to the deassertion of the reset signal R2, the reset signal R3 that indicates the logical product of the reset signal R2 and the reset signal R1 is also deasserted. The main CPU 111 is released from the reset state in response to the deassertion of the reset signal R3, and reads the main CPU program 201 from the flash memory 104 to execute the read main CPU program 201, thereby being activated (booted).

In both the first and second scenarios, the PMU 112 has already started supplying the power P2 to the devices 122 of the information processing apparatus 100 before the determination is made that the main CPU program 201 is valid. Accordingly, it can be seen that a period of time from the power-on until the information processing apparatus 100 becomes available becomes short in the present embodiment, as compared to a case where the supply of the power to the devices is started subject to the completion of the verification of the program.

In addition, in the present embodiment, the main CPU 111 starts executing the main CPU program 201 that may include the boot program at least based on the control signal C1 indicating that the main CPU program 201 is determined to be valid. In other words, even when the power is supplied to the SoC 102 in response to the power-on, the main CPU 111 on the SoC 102 does not execute the program before the sub-CPU 103 determines that the program is valid. In this way, in the present embodiment, security is ensured against risks of unauthorized operations of the information processing apparatus 100 due to alteration or degradation of the program.

3. Procedure of Processing

Figure 5:
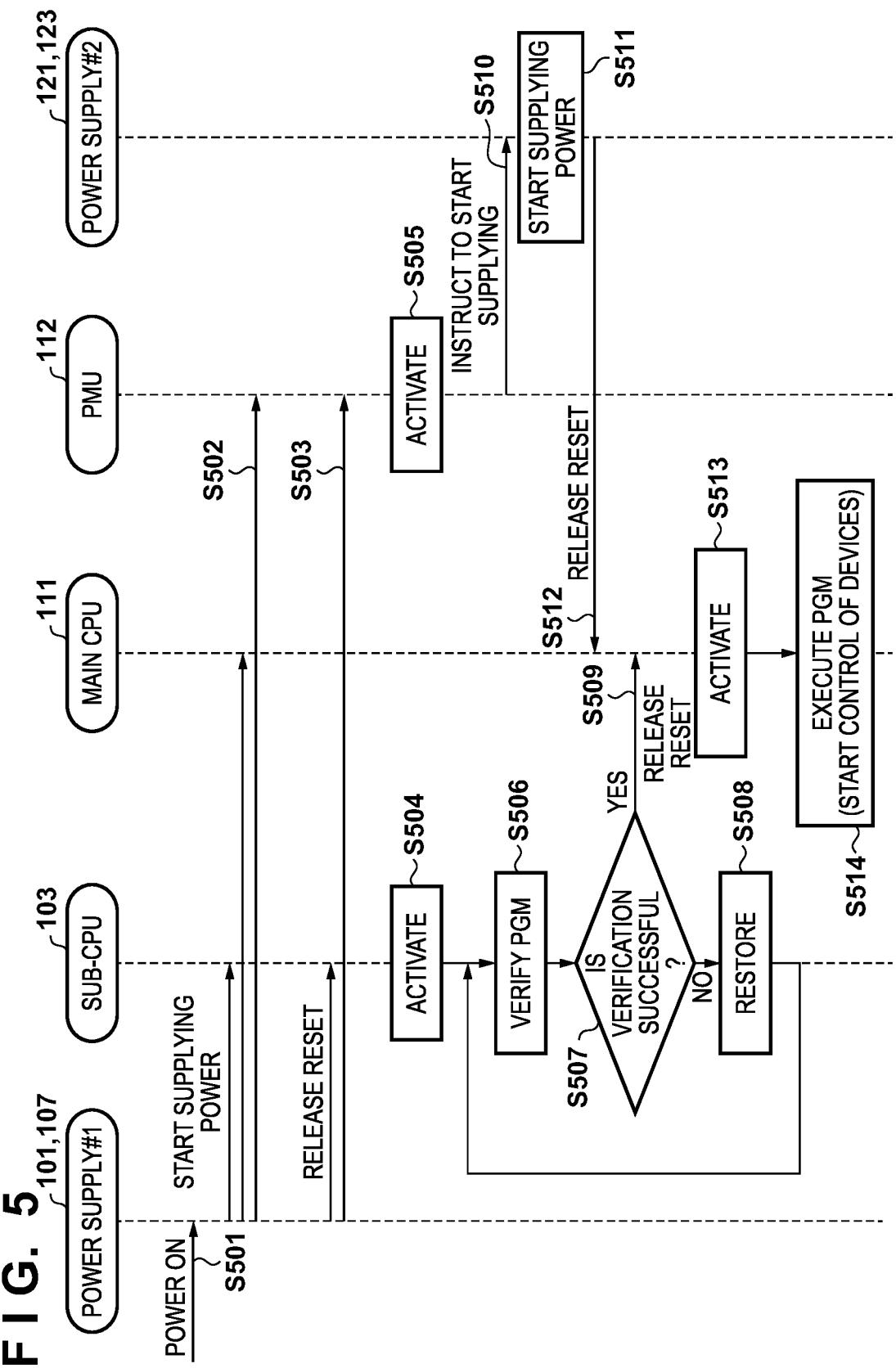
FIG. 5 is a sequence diagram illustrating an example of a procedure of processing to be performed during activation of the information processing apparatus in an embodiment.

FIG. 5 is a sequence diagram illustrating an example of a procedure of processing to be performed during activation of the information processing apparatus 100 in the above-described embodiment. The first power supply unit 101, the first power monitoring unit 107, the sub-CPU 103, the main CPU 111, the PMU 112, the second power supply unit 121, and the second power monitoring unit 123 are involved in the processing illustrated in FIG. 5. Note that in the following descriptions, a processing step is abbreviated as S (step).

First, in S501, the first power supply unit 101 receives a user operation by which the power switch is turned on. In response to detecting this user operation, the first power supply unit 101 starts the supply of the power P1 to the sub-CPU 103, the main CPU 111, and the PMU 112 in S502.

Next, the first power monitoring unit 107 deasserts the reset signal R1 in S503 in response to the power level of the power P1 exceeding the threshold value, thereby releasing the sub-CPU 103 and the PMU 112 from the reset states. The sub-CPU 103 is activated in S504 in response to the release of the reset state. In parallel with that, the PMU 112 is also activated in S505.

In S506, the sub-CPU 103 then verifies the validity of the main CPU program 201 stored in the flash memory 104. Next, in S507, the sub-CPU 103 determines whether or not the verification is successful, that is, whether or not the main CPU program 201 is valid. When the verification fails, the sub-CPU 103 restores the main CPU program 201 by using the version for restoration 203 in S508. Subsequently, processing of the sub-CPU 103 returns to S506. On the other hand, when the sub-CPU 103 determines that the main CPU program 201 is valid in S507, the sub-CPU 103 deasserts the control signal C1 in S509.

After being activated in S505, the PMU 112 instructs the second power supply unit 121 to start the supply of the power P2 to the respective devices 122 in S510. The second power supply unit 121 starts the supply of the power P2 to the devices 122 in S511 in response to the instruction described above from the PMU 112. Each device 122 may perform a unique setup sequence to move to a state in which control by the main CPU 111 is awaited when the supply of the power P2 is started. Next, the second power monitoring unit 123 deasserts the control signal C2 in S512 in response to the power level of the power P2 exceeding the threshold value. The deassertion of the control signal C2 may be performed earlier than the deassertion of the control signal C1 by the sub-CPU 103 in S509 (however, it does not matter which of the control signals C1 and C2 is de-asserted earlier).

In S513, the main CPU 111 starts operating by executing the main CPU program 201 in response to the control signals C1 and C2 and the reset signal R1 being deasserted. Then, in S514, the main CPU 111 executes other required programs to start the control of the devices 122 of the information processing apparatus 100.

In the embodiment described above, deassertion of the reset signal R2 is subject not only to the program being determined to be valid but also to the level of the power P2 supplied to each device 122 exceeding the threshold value. According to such a condition, the main CPU 111 may be activated after the devices 122 are ready to operate with the power P2, and may immediately start the control of the devices 122. However, the main CPU 111 may be activated without necessarily waiting for an increase in level of the power P2. In the following section, such a modification example will be described.

4. Modification Example

Figure 6:
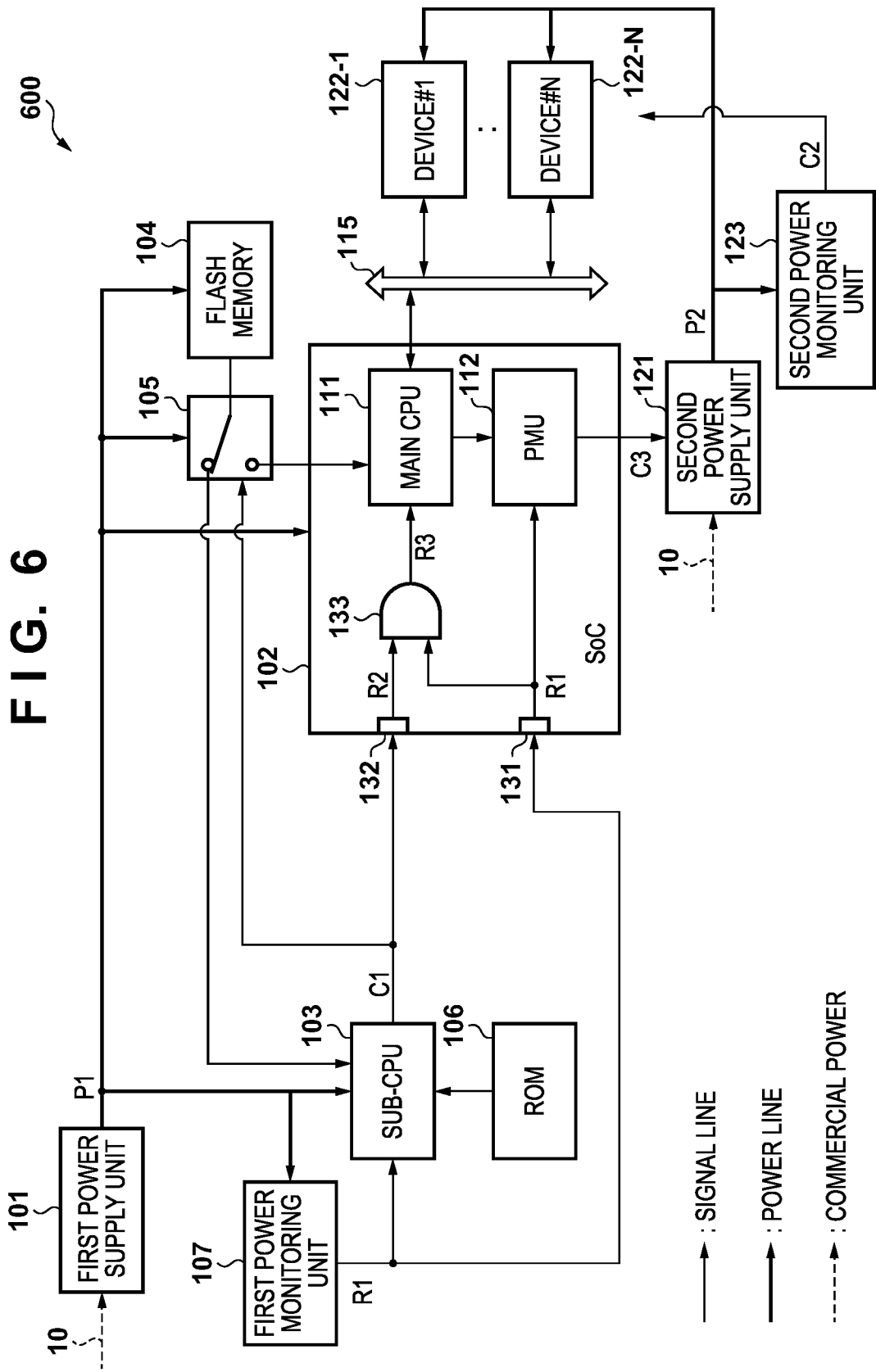
FIG. 6 is a block diagram illustrating an example of a configuration of an information processing apparatus according to a modification example.

FIG. 6 is a block diagram illustrating an example of a configuration of an information processing apparatus 600 according to a modification example. In comparison to the configuration of the information processing apparatus 100 illustrated in FIG. 1, the information processing apparatus 600 does not include the AND circuit 134. The reset signal R2 by which the main CPU 111 is released from the reset state is substantially the same signal as the control signal C1 indicating whether or not the program is determined to be valid by the sub-CPU 103. The control signal C2 output by the second power monitoring unit 123 may be used as a reset signal, for instance, to maintain one or more of the devices 122 in the reset state or release them from their reset states. When the control of the reset states of the devices 122 is not required, the second power monitoring unit 123 may be omitted from the configuration of the information processing apparatus 600. In the present modification example, the configuration of the information processing apparatus 600 is further simplified as described above, and therefore, it is possible to reduce the apparatus in size and to reduce the manufacturing cost of the apparatus.

In the modification example as well, the PMU 112 is released from the reset state in response to the deassertion of the reset signal R1. In other words, similarly to the sub-CPU 103, the PMU 112 starts the operation in response to the main power supply of the information processing apparatus 600 being turned on, and instructs the second power supply unit 121 to start the supply of the power P2 to each device 122. The operation of the main CPU 111 is suppressed by the reset signal R3. The AND circuit 133 receives the reset signal R1 and the reset signal R2 and then outputs the reset signal R3 indicating the logical product of these signal values to the reset terminal of the main CPU 111. Accordingly, the main CPU 111 is released from the reset state only when the reset signal R1 is deasserted and the control signal C1 (reset signal R2) is deasserted.

Figure 7:
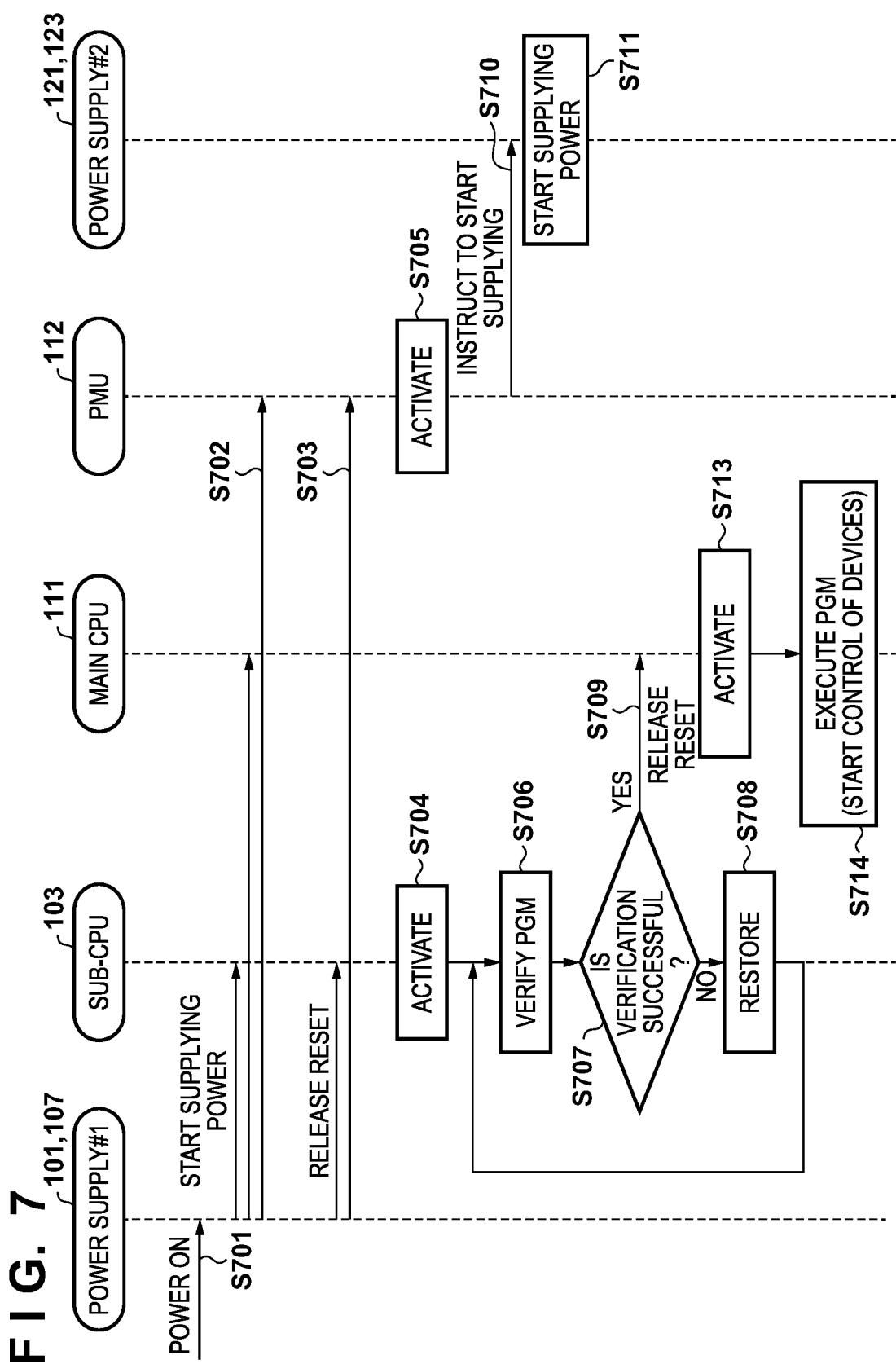
FIG. 7 is a sequence diagram illustrating an example of a procedure of processing to be performed during activation of the information processing apparatus in a modification example.

FIG. 7 is a sequence diagram illustrating an example of a procedure of processing to be performed when the information processing apparatus 600 is activated in the present modification example. The first power supply unit 101, the first power monitoring unit 107, the sub-CPU 103, the main CPU 111, the PMU 112, the second power supply unit 121, and the second power monitoring unit 123 are involved in the processing illustrated in FIG. 7.

S701 to S708 in FIG. 7 are processing steps similar to those of S501 to S508 in FIG. 5, and thus redundant descriptions thereof will not be made. When the sub-CPU 103 determines that the main CPU program 201 is valid in S707, the sub-CPU 103 deasserts the control signal C1 in S709. The control signal C1 is output to the second input terminal 132 of the SoC 102. The second input terminal 132 outputs the control signal C1 received from the sub-CPU 103 to the AND circuit 133 as the reset signal R2.

After being activated in S705, the PMU 112 instructs the second power supply unit 121 to start the supply of the power P2 to each device 122 in S710. The second power supply unit 121 starts the supply of the power P2 to each device 122 in S711 in response to the instruction described above from the PMU In S713, the main CPU 111 starts operating by executing the main CPU program 201 in response to the assertion of the reset signal R1 and the reset signal R2. Then, in S714, the main CPU 111 executes other required programs to start the control of the devices 122 of the information processing apparatus 600.

5. Summary

Thus far, the embodiment of the present disclosure has been described in detail by using FIG. 1 to FIG. 7. In the embodiment described above, a sub-CPU starts verifying a program in response to an information processing apparatus being powered on, and the sub-CPU outputs a first control signal when the program is determined to be valid. A main CPU of the information processing apparatus starts executing the program at least based on the first control signal. Meanwhile, before the determination that the program is valid, a PMU in the information processing apparatus starts supply of power to at least one device of the information processing apparatus. According to such a configuration, security is preserved against the risk that the device(s) of the information processing apparatus operates under control of an unauthorized program because the main CPU operates based on the program determined to be valid by the sub-CPU. In addition, since a sequence associated with the start of the supply of the power to each device is started without waiting for completion of verifying the validity of the program, a period of time required for activation of the information processing apparatus can be shortened. Accordingly, a user can use the information processing apparatus earlier after powering on the information processing apparatus. For instance, the supply of the power to the at least one device may be started in response to the information processing apparatus being powered on. In this case, regardless of a state in which the program is verified by the sub-CPU, each device can be quickly brought into a state in which control of the main CPU is awaited.

In addition, in the above-described embodiment, the main CPU and the PMU are provided on a common chip. In this case as well, power control by the PMU can be started before the verification of the program is successful and activation of the main CPU is allowed, and thus, the period of time required for the activation of the information processing apparatus can be shortened. For instance, the PMU may be released from a reset state by a first reset signal received by a first terminal of the chip. On the other hand, the main CPU may be released from a reset state by a third reset signal indicating a logical product of the first reset signal and a second reset signal received by a second terminal of the chip. By incorporating an arithmetic circuit for such a logical product into the chip, timings of the activation of the main CPU and the PMU can be made different from each other, and the PMU can be activated earlier than the main CPU while security is being ensured.

In addition, in the above-described embodiment, the sub-CPU may restore the program by overwriting the program in a memory with a version for restoration of the program when it is determined that the program is not valid. According to such a configuration, the information processing apparatus can be automatically returned to a normally-operable state without requiring maintenance work even when the program becomes invalid due to alteration or degradation. Then, the period of time to be required for the activation of the information processing apparatus after the restoration can be shortened.

6. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-026472, filed on Feb. 19, 2020 which is hereby incorporated by reference herein in its entirety.

What is claimed is:

1. An information processing apparatus, comprising:
at least one device;
a first processor configured to control the at least one device;
a second processor configured to verify validity of a program to be executed by the first processor, and to allow the first processor to execute the program when the program is determined to be valid; and
a control circuit configured to control supply of power to the at least one device;
wherein the second processor is configured to start the verification of the program in response to the information processing apparatus being powered on;
the first processor is configured to start the execution of the program at least based on a first control signal indicating that the program is determined to be valid by the second processor;
the control circuit is configured to start the supply of the power to the at least one device before the determination that the program is valid; and
the first processor and the control circuit are provided on a common chip; and
wherein the chip includes:
a first terminal configured to receive a first reset signal by which the control circuit is released from a reset state;
a second terminal configured to receive a second reset signal by which the first processor is released from a reset state; and
a first arithmetic element configured to output a third reset signal indicating a logical product of the first reset signal and the second reset signal to the first processor.

2. The information processing apparatus according to claim 1,
wherein the control circuit is configured to start the supply of the power to the at least one device in response to the information processing apparatus being powered on.

3. The information processing apparatus according to claim 1, further comprising:
a power monitoring unit configured to output a second control signal indicating whether or not a level of the power supplied to the at least one device exceeds a threshold value; and
a second arithmetic element configured to output the second reset signal indicating a logical product of the first control signal and the second control signal to the second terminal of the chip;
wherein the second reset signal indicates a value instructing that the first processor is to be released from the reset state when the first control signal indicates that the program has been determined to be valid and the second control signal indicates that the level of the power supplied to the at least one device exceeds the threshold value.

4. The information processing apparatus according to claim 1,
wherein the second reset signal is the first control signal.

5. The information processing apparatus according to claim 1, further comprising:
a storage unit configured to store the program;
wherein the storage unit is configured to receive supply of power in response to the information processing apparatus being powered on.

6. The information processing apparatus according to claim 5,
wherein the second processor restores the program by overwriting the program in the storage unit with a version for restoration of the program when the program is determined to be invalid.

7. The information processing apparatus according to claim 1,
wherein the at least one device includes at least one of a printer device, a scanner device, an operating device, a display device, a device controller, an image processing unit, and a communication interface.

8. A method to be performed in an information processing apparatus including at least one device, a first processor configured to control the at least one device, a second processor configured to verify validity of a program to be executed by the first processor, and a control circuit configured to control supply of power to the at least one device, wherein the first processor and the control circuit are provided on a common chip, and wherein the chip includes: a first terminal configured to receive a first reset signal by which the control circuit is released from a reset state; a second terminal configured to receive a second reset signal by which the first processor is released from a reset state; and a first arithmetic element configured to output a third reset signal indicating a logical product of the first reset signal and the second reset signal to the first processor, the method comprising:
    starting, by the second processor, the verification of the program in response to the information processing apparatus being powered on;
    outputting, by the second processor, a first control signal indicating that the program has been determined to be valid when the program is determined to be valid;
    starting, by the first processor, the execution of the program at least based on the first control signal; and
    starting the supply of the power to the at least one device before the determination that the program is valid.

\* \* \* \* \*